Nov. 20, 1923.  
F. H. JONES  
1,475,121  
METHOD AND APPARATUS FOR CONTROLLING SUGAR CENTRIFUGALS  
Filed Dec. 28, 1920    2 Sheets-Sheet 2

INVENTOR  
FRANK H. JONES

Patented Nov. 20, 1923.

1,475,121

UNITED STATES PATENT OFFICE.

FRANK HOWARD JONES, OF TUINUCU, CUBA.

METHOD AND APPARATUS FOR CONTROLLING SUGAR CENTRIFUGALS.

Application filed December 28, 1920. Serial No. 433,632.

*To all whom it may concern:*

Be it known that I, FRANK H. JONES, a citizen of the United States, and a resident of Tuinucu, Cuba, have invented a new and Improved Method and Apparatus for Controlling Sugar Centrifugals, of which the following is a full, clear, and exact description.

This invention relates to a system and co-operating apparatus for controlling electrically operated sugar centrifugals and similar devices.

An object of the invention is to provide means whereby the electric motor driving the centrifugal will, when a stop button is pushed, slow down and in so doing return power to the line.

Another object of the invention is to provide means whereby when the motor is slowing down an electric brake applied to the shaft of the centrifugal will stop the same at a predetermined speed at the same time that a clutch connected to the shaft disconnects the motor from a centrifugal.

A further object resides in the provision of means whereby the motor is started by pushing a single button, and in speeding up to its normal operating speed, the circuit arrangements are such that the electric brake is not applied, the clutch taking hold at a predetermined speed of the shaft.

A still further object of the invention resides in the particular construction and arrangement of parts to be hereinafter described and claimed and shown in the accompanying drawings.

In general, my invention comprises the provision of an alternating current motor which is connected through a centrifugal clutch and an electric brake with a sugar centrifugal. An electro-magnetic switching device is provided whereby the motor connections may be changed to increase or decrease the number of poles of the motor at will. A simple push-button switch is provided, or some switch similar in action, whereby by pushing one button the motor will be connected with a given number of poles to the line and start to revolve. As the speed increases, the automatic centrifugal clutch takes hold to start the sugar centrifugal. The motor maintains its normal operating speed until it may be desired to stop the centrifugal. When this is desired, a stop button is pressed, and circuit arrangements are such that immediately the coil connections of the motor are changed, whereby the number of the pole connections of the motor are increased and the motor tends to slow down to synchronism with the line frequency. In slowing down, the motor, in a manner well known in the art, will return power to the line, acting as a generator. When a predetermined minimum speed is reached, the centrifugal clutch will disconnect the motor from the sugar centrifugal and at the same time circuit arrangements will be brought into play to apply the electric brake and stop the centrifugal. Simultaneously, other electrical connections are operated, by reason of the motion of the motor shaft, to disconnect the motor from the line and to apply the electrical brake.

Such a circuit arrangement, whereby the above-mentioned actions take place merely upon the pushing of a start and a stop button, are highly advantageous with respect to such devices as sugar centrifugals, which in one day of twenty-four hours may be started and stopped as many as two or three thousand times. For reasons hereinafter to be given, the amount of power saved by my combination of apparatus and the co-operating circuit arrangement would be sufficient to run the plant for an hour.

Other and detail features of my invention will appear from a consideration of the description hereinafter set forth, especially when taken in connection with the accompanying drawings.

The invention is illustrated in the drawings, in which—

Figure 1:
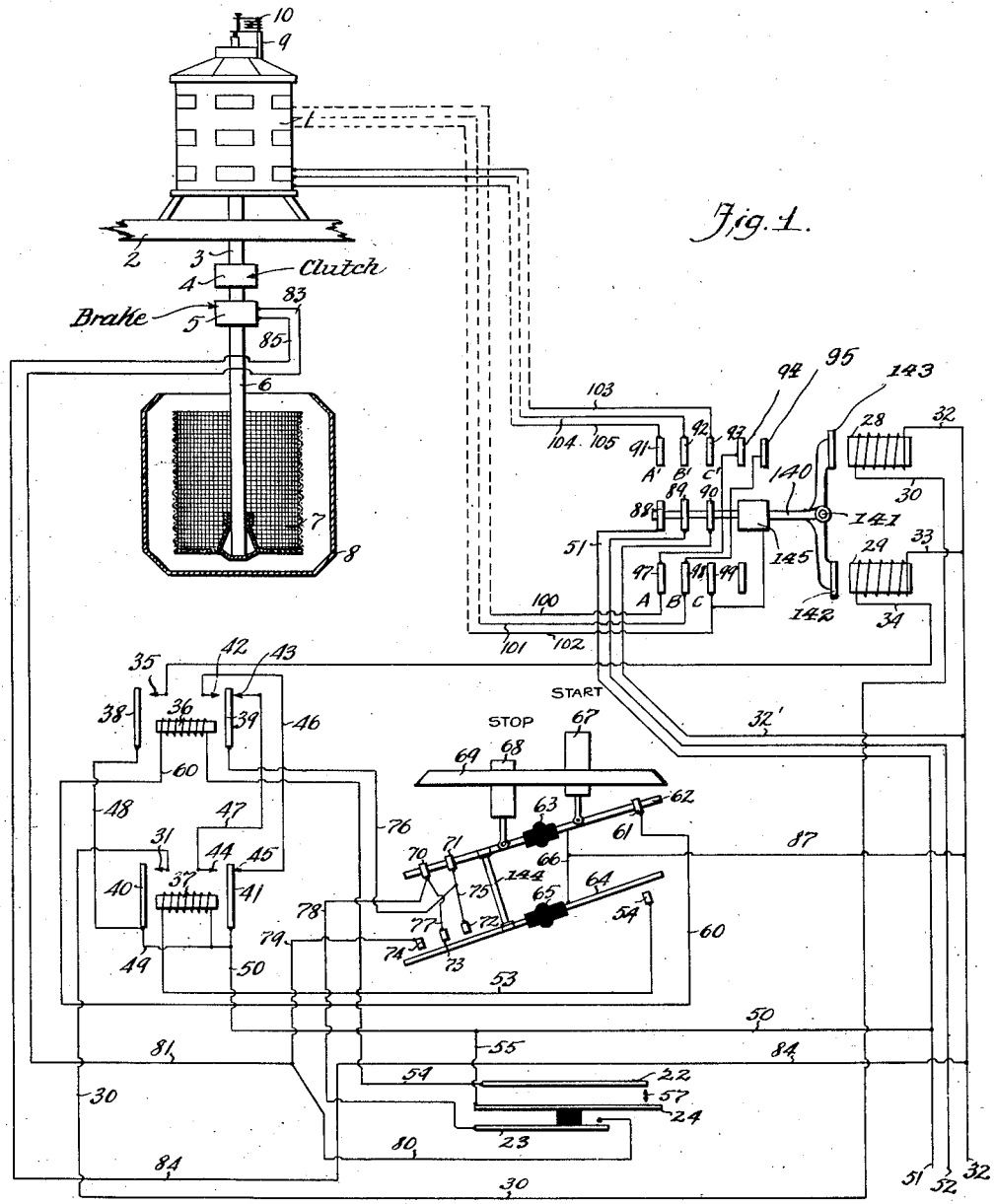
Figure 1 is a diagrammatic representation of the apparatus and co-operating circuit.

As shown in the drawings, the combination of apparatus and circuits operating in accordance with my invention comprises an alternating current motor, which may be a 20 horse power alternating current motor of three phase, sixty cycle type, adapted to drive a sugar centrifugal or basket forty inches by twenty-four inches. This motor is mounted on any suitable platform 2 and connected by a shaft 3 to a centrifugally operated clutch 4 of any suitable type and an electro-magnetically operated brake 5. This brake may be of any suitable type. On the lower end 6 of shaft 3 a sugar centrifugal or basket 7 is provided surrounded by a suitable casing 8.

Figure 2:
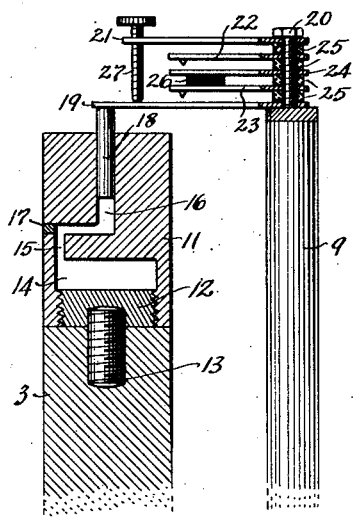
Figure 2 is a detail partial sectional view of a centrifugally operated switch applied to the top of the motor shaft.

On the casing of the motor a short shaft 9 is mounted and adapted to support a centrifugally operating switch device 10. As shown in Figure 2, to the upper end of the motor shaft 3 a metallic block 11 is applied having an inner bore 14 closed normally by a threaded plug 12 and connected to the upper end of the shaft by a threaded stud 13. A narrow passage 15 connects the bore 14 with an axially aligned bore 16. A plug 17 closes the opening from the passage of block 11 into the passage 16, whereby upon removal of the plug 17 the passages may be cleaned. In the vertically extending, axially disposed bore of passage 16 a piston or pin 18 is disposed. The bore 14 and cooperating passages is filled with liquid, such as mercury or oil, and upon the revolution of the motor shaft 3 centrifugal action forces the liquid up into the passage 16 against the bottom of the pin 18. The upper end of this pin is adapted to bear against a spring 19 fastened at the other end to the upper end of rod 9. The end of rod 9 is provided with a threaded pin 20 on which are mounted a plurality of springs 21, 22, 23 and 24. The springs 19 and 23 are adapted to make electrical contact with each other when moved, although they are normally open when the machine is at rest. Likewise, the springs 24 and 22 are adapted to make electrical contact when the machine has attained a certain speed. The springs are separated insulatingly by blocks of insulation 25 mounted on a threaded pin 20. A threaded pin 27 is disposed to the end of the spring 21 and bears against the upper face of the spring 19 to adjust the tension of the spring 19 against the top of the pin 18. A plug of insulation 26 is disposed between the spring 23 and the spring 24 to electrically separate the same. This switching device, in the normal operation of the machine, is supposed to close the above-mentioned contacts when the motor shaft has reached a speed of 600 revolutions per minute and to maintain these contacts closed until higher speeds, due to the centrifugal action of the liquid above mentioned, are attained. The character of contact between the spring 19 and the top of the pin 18 may be varied in any suitable way to eliminate friction.

Figure 3:
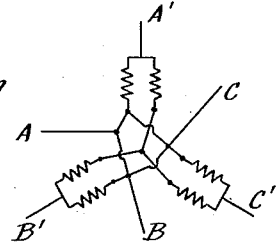
Figure 3 is an electrical diagram of the motor pole connections for high speed.
Figure 4:
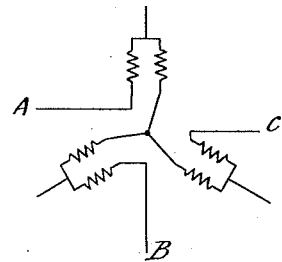
Figure 4 is an electrical diagram of the motor pole connections for low speed operations.
Figure 5:
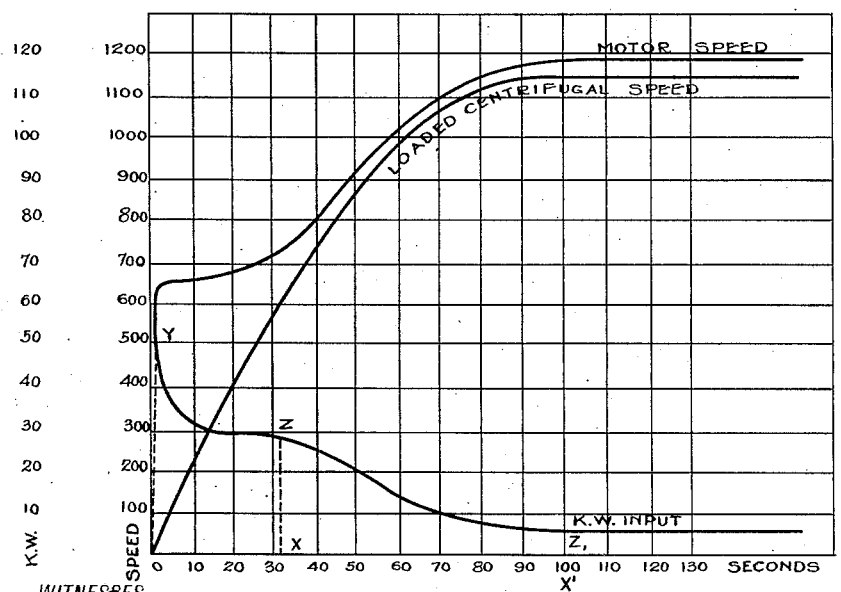
Figure 5 is a curved diagram illustrating graphically the amount of power saved in one cycle of operations.

As shown in Figures 3 and 4, conventional diagrams of the polar connections for the motor at 1200 and 600 revolutions per minute, respectively, are represented. In the average sized sugar mill the saving of power is a big item. Two speed, three phase or two phase motors are now standard equipment. The curved chart in Figure 5 shows the centrifugal speed and the kilo watt input of the motor, assuming it to be a 20 horse power motor acting on a 40-inch or 24-inch centrifugal. Assuming that when the stop button is pushed the motor slows down from twelve to six hundred before being disconnected from the line, the electrical energy which can be recovered in each cycle of operation is approximately represented by the area under the curve YZXO, which is approximately .26 kw. hours. In a raw sugar mill house of 300,000 bag capacity the average number of cycles of both first and second centrifugals for twenty-four hours of operation would be nearly 1900, which multiplied by .26 would equal a total of 494 or approximately 500 kw. hours per day. With a non-condensing, turbine-operated electric plant using 1,000 kilo watts and generators operated at about three-quarters load or 750 kilo watts, it is readily seen that a saving by this method of regenerative braking would nearly run the whole load for one hour. This saving is in addition to a saving of about ten per cent which can be made by operating the centrifugal by individual motors. The turbines using steam at ninety pounds have a rating of about fifty pounds of steam per kw. hour at three-quarters load. Therefore, 500 kw. hours would represent about 25,000 pounds of steam saved each day. At present with hand braking, all the energy stored in the motor and spindle and centrifugal is dissipated in the hand brake used in stopping, and none of this energy is recovered, whereby the brake bands suffer heavily under the very frequent cycles of starting and stopping.

Electro-magnets 28 and 29 are provided in an apparatus of any suitable design to change the connections to the motor to vary the number of poles at will. The magnet 28 is connected by wires 30 and 32, the wire 32 being connected to one side of the three-phase line and the wire 30 leading to the back contact 31 of a relay magnet 37. The electro-magnet 29 is connected to wires 33 and 34, the wire 33 connected to the wire 32 and the wire 34 connected to back contact 35 of a relay magnet 36. This magnet 36 is provided with two armatures 38 and 39, and the relay magnet 37 is provided with two armatures 40 and 41. The armature 39 has a front contact 42 and a back contact 43, whereas the armature 41 has a front contact 44 and a back contact 45. The front contact 42 is connected by a wire 46 to the back contact 45. The back contact 43 is connected by wire 47 to the front contact 44. The armature 38 is connected by wire 48 to the armature 40, which in turn is connected by a wire 49 to a wire 50 leading to one side 51 of a three-phase power line. The other side of the three-phase power line is represented by the wire 52. One end of the winding of relay magnet 37 is connected by wire 53 to a switch contact 54. The wire 50 is connected by a wire 55 to the contact spring 24. The spring 24, as above mentioned, is adapted to make contact with a contact 57 on a spring 22 when the motor shaft reaches any speed above 600 R. P. M. One end of spring 22 is connected by wire 59 which leads to one end of the winding of relay magnet 36. The other end of the relay magnet 36 is connected by wire 60 to a switch contact 61 with which an arm 62 of a switch is adapted to connect in one position thereof. The switch arm 62 is divided in two by a block of insulation 63. Similarly, another switch arm 64 is divided in two by a block of insulation 65. The right-hand halves of the arms 62 and 64, however, are connected at all times by a wire 66. The arms 62 and 64 are connected mechanically together in any well-known manner, so that push buttons 67 and 68 can move these arms in one direction or the other. These buttons are mounted on the usual plate 69. The switch arms 62 and 64 are connected by a rod 144 for simultaneous operation of the arms.

Disposed with relation to the left-hand end of arm 62 are two contacts 70 and 71. Similarly, contacts 72, 73 and 74 are disposed with respect to the left-hand end of arm 64. A wire 75 connects contacts 71 and 72. A wire 76 leads from wire 75 to armature 39 and relay magnet 36. A wire 77 connects contacts 73 and 70. Wire 78 leads from wire 77 to spring 23. A wire 79 leads from contact 74 to a wire 80 connected to the spring 19. A wire 81 connects wire 79 with a wire 83 leading to one side of the circuit of the electro-magnetic brake 5. From the wire 32 of the three-phase line, a wire 84 extends to the other side of the electro-magnetic brake through wire 85. A wire 87 extends from wire 66 to wire 32. The pole switch controlled by the electro-magnets 28 and 29, above mentioned, is provided with a plurality of contacts and is of the well-known construction which is diagrammatically represented in Figure 1. These contacts are represented by the numerals 88, 89 and 90 to which the wires 51, 52 and 32' are connected from a three-phase power line. When the magnet 28 is operated, connection is made with a set of contacts 91, 92, 93 and 94. Associated with the central contacts 88, 89 and 90 are a pair of contacts 95 and 96. Similarly, when the magnet 29 is operated, the power connections are made with contacts 97, 98 and 99. Wires 100, 101 and 102 lead from the contacts 97, 98 and 99 to the field winding of the motor, and wires 103, 104 and 105 extend to the motor windings from contacts 91, 92 and 93. Therefore, when one or the other of magnets 28 and 29 are operated, the number of poles in the motor is changed by this mechanism, which is of any well-known type, being merely schematically represented in the drawings.

An arm 140 pivoted at 141 has contact members 142 and 143 respectively located adjacent the magnets 28 and 29. When magnet 28 is energized member 143 is affected to tilt the arm 140 and thereby move contacts 88, 89 and 90 into engagement with the respective contacts 91, 92 and 93. A large contact 145 engages the contacts 94 and 95. When magnet 29 is energized member 142 is affected which causes the arm 140 to move in the opposite direction and thereby shift the contacts 88, 89 and 90 respectively into engagement with the contacts 97, 98 and 99. When the large contact 145 is moved into engagement with contacts 94 and 95, the wires 100, 101, and 102 leading to the motor windings are short circuited to establish a second start point as is usual in this form of control.

In the operation of the device, it is assumed that the motor is stopped and that the stop button 68 is in the position shown in Figure 1. It is also assumed that the centrifugal contacts shown in Figure 2 are open. Therefore, to start the operation of the system, the button 67 is pressed downwardly. This makes a connection between line 32, through wire 87 with wire 66, arm 64, contact 54, wire 53, relay magnet 37, wire 50, back to wire 51, which is the opposite side of the line. As relay magnet 37 energizes, the armature 40 is pulled against the back contact 31. This energizes wire 30 through wire 49 and wire 50 which is connected with the line. Wire 30 extends to the magnet 28, the other side of which is connected to the opposite side of the line. The magnet 28 energizes throwing the pole changer to connect the motor as a six-pole motor. The motor starts to revolve and soon reaches its normal operating speed of 1200 revolutions per minute.

It will be noted at this time that one side of the electro-magnet brake 5 is connected through wire 84 with one side of the line, the other side of this brake being connected by a wire 81 through wire 80 to spring 23 only when the speed of the motor shaft is increased above 600 revolutions. Therefore, from zero to 600 R. P. M. this contact is open. However, an electrical connection is made for the brake up to this point by means of wire 79 leading to contact 74, the left-hand end of arm 64 making contact in the starting position with contacts 74, 73 and 72. Therefore, the circuit for the electro-magnetic brake 5 is closed as follows: wire 81, wire 79, contact 74, the left-hand end of arms 64, contact 72, wire 75, wire 76, armature 39, back contact 43, wire 47, front contact 44, armature 41, which has been pulled up by the relay magnet 37, wire 50, to the other side of the line through wire 51. In other words, the electro-magnetic brake is of the type which is held open when energized by current, and which applies a braking action only when the current is cut off. Therefore, in accordance with the circuit just traced, as soon as the starting button is pressed the brake is energized to be released from the shaft, and it will be seen that this circuit, by being traced from the left-hand end of arm 64, is always closed as soon as this arm is in this position.

As soon as the speed of the motor shaft increases to 600 R. P. M., another circuit for the magnetic brake is closed as follows: from wire 81, wire 80, contact spring 19, spring 23, wire 78 to contact 70, wire 77, contact 73, contact 72, wire 75, wire 76, and so on as before to the other side of the line.

Therefore, when it is desired to stop the motor, the only operation necessary is to press the button 68, whereupon the switch arms will assume the position shown in Figure 1. This movement will break the power connection to the relay magnet 37 at the contact 54 but will make a power connection for the relay magnet 36 through the contact 61, right-hand end of arms 62, wire 66, wire 87, to the line. From contact 61, wire 60 connects with the winding of relay magnet 36, the other side of which is connected by wire 59 with spring 22, contact 57, spring 24, wire 55, wire 50, to wire 51 and the other side of the line. At this time the motor is rotated at a speed above 600 R. P. M. so that the contact 57 and the spring 24 are engaged. The energization of relay magnet 36 operates the armatures 38 and 39. Through armature 38 the following circuit is made: from wire 51, wire 50, wire 49, wire 48, armature 38, back contact 35, wire 34, magnet 29, wire 33 to wire 32 and the other side of the line. This energizes magnet 29 to move the pole-changer switch to connect the contacts 97, 98 and 99 with the contacts 88, 89 and 90, changing the number of poles of the motor from six to twelve, whereby the motor tends to slow down to a speed of 600 R. P. M. It will be noticed that when the circuit of relay magnet 37 is deenergized as above mentioned, the armatures and contacts assume normal position again, as shown in Figure 1.

It will also be observed that armature 41 drops back on to back contact 45, connecting wire 46 with front contact 42, which is now engaging with the armature 39, since the relay magnet 36 is energized. The following circuit, therefore, can be traced: from the wire 32, wire 84, electro-magnetic brake 5, wire 83, wire 81, wire 80, spring contact 19, spring 23, wire 78, contact 70, left-hand end of arm 62, contact 71, wire 76, armature 39, front contact 42, wire 46, back contact 45, wire 50 to wire 51 on the other side of the line. In other words, this enables the magnetic brake to still be energized and be released from the shaft by reason of the fact that the springs 23 and 19 are closed as the motor slows down until the speed of the motor decreases below 600 R. P. M., at which time this contact is open and the circuit for the magnet is open, thereby permitting it to brake the shaft to stop the sugar centrifugal. At the same time that the magnetic-brake circuit is opened, the circuit for the motor is also opened between springs 22 and 24 by reason of contact 57, caused by the deenergization of magnet 28. The circuit of relay magnet 36 has been traced through the contact 57, and when the speed of the motor decreases to such an amount that this contact is open, the relay magnet 36 is deenergized. This causes the armature 38 to drop back and deenergize magnet 29, whereby the motor switch is thrown into an open and normal position, disconnecting the motor from the line, at the same time the armature 39 drops back into position so that as soon as armature 41 engages with its front contact 44 upon the energization of relay magnet 37 when starting the motor the circuit for the electro-magnetic brake will be immediately established, as above mentioned.

In general, therefore, the operation of the push button 67 operates the relay magnet 37, which in turn operates the magnet 28, starting the motor on a 1200 revolution connection. At the same time, by reason of the armatures and contacts on the relay magnet 37 and the centrifugal contacts on the shaft of the motor, the electrical brake is kept open, while the motor is speeded up from zero to 1200 R. P. M.

On the other hand, when the stop button 68 is depressed, this operates the relay magnet 36 which in turn energizes the electro-magnet 29, and at the same time the magnet 28 is released. The motor then slows down to 600 R. P. M., during which time it returns current to the line. When 600 R. P. M are reached, the centrifugal contacts on the shaft of the motor open up and simultaneously open the circuit for the electromagnetic brake, and the motor causes the spindle of the sugar centrifugal to be brought to a dead stop. During this time the centrifugal clutch 4 has operated to connect the sugar centrifugal with the motor for all speeds above 600 R. P. M. and disconnect the sugar centrifugal from the motor for all speeds below 600 R. P. M.

It is apparent and will be understood that any type of switches, relays, electro-magnets, and other parts of the apparatus can be used which meet the requirements of the above-mentioned cycles of operations and that, therefore minor variations can be made in the selection of apparatus to be used in this system without departing from the spirit of the invention. It may perhaps be that a different type of switch than the push-button switch can be better adapted for the purpose of performing these functions. The extreme advantage of my invention, however, lies in the fact that merely by pressing one or the other of two buttons all this operation is effected automatically and results in a great saving of power, as above set forth.

What I claim is:

1. An automatic regulator for sugar centrifugals, which comprises a power line, an element to be energized and deenergized, one side of said element connected directly to the power line, a manually operated switch, a motor connected to the line, motor-controlled circuit closure connected to the other side of said element, said switch having two positions, a direct connection between the switch and said element in one position of the switch, a connection between the switch and the element through the motor-controlled circuit closure in the same position of the switch, and connections between the switch and the element through the motor-controlled circuit closure alone in the other position of the switch.

2. A regulator for sugar centrifugals, which comprises a motor, a shaft, a power line to which the motor is connected, an electro-magnetic brake associated with the motor shaft, one side of the brake connected to the power line, a manually-operated switch, motor-controlled circuit closures, said switch having start and stop positions, means for establishing between the switch and the brake simultaneously a direct connection and a connection through the motor-controlled circuit closure when the switch is moved to one position, and means when the switch is moved to the other position to maintain the circuit through the motor-controlled circuit closures and break the direct connection.

3. A regulator for sugar centrifugals, which comprises a power line, a motor connected to the power line, a motor shaft, an electro-magnetic brake on said shaft, one side of the brake connected directly to the power line, a manually-operated switch to which the other side of the brake is connected, a centrifugal motor-controlled circuit closer disposed between the manual switch and the brake, means associated with the switch for closing a direct circuit between the switch and the brake when the switch is moved to one position simultaneously with the establishment of the circuit between the switch and the brake through the motor-controlled circuit closure whereby when the motor speed has exceeded a minimum amount the motor-controlled circuit closure establish a circuit for the brake therethrough, and means associated with the switch to disconnect the direct connection when the switch is moved to another position but to maintain closed the circuit through the motor-controlled circuit closure to said brake whereby when the switch is moved to this second position the brake will be in circuit until the motor has slowed down below a definite amount.

4. A regulator for sugar centrifugals, which comprises a power line, an electro-magnetic brake one side of which is connected directly to the power line, a switch contact connected directly to the other side of the brake, a motor connected to the power line, a centrifugal circuit closure operated by the motor, said centrifugal circuit closure connected to the brake in parallel with the above-mentioned switch contact, and a pair of switch contacts connected to the centrifugal circuit closure, one of said pair of contacts engaged by the switch in one position and the other of said contacts engaged by the switch in another position, so that in either position of the switch a circuit is established through the centrifugal circuit closure, the switch contact connected directly to the brake being engaged by the switch only in one position.

5. A regulator for sugar centrifugals, which comprises a power line, a manually-operated switch having two positions, a pair of magnets, connections between the switch and said magnets whereby one magnet is connected to the line in one position of the switch and the other magnet is connected to the line in another position of the switch, the return wire of one of said magnets being connected directly to the other side of the line, a motor connected to the line, and a centrifugal circuit closure operated by the motor, the other of said magnets being connected by a return wire to the line through said centrifugal circuit closure.

6. A regulator for sugar centrifugals, which comprises a pair of magnets adapted alternately to be energized, an armature for each of said magnets, front and back contacts for each armature, the back contact of one armature connected to the front contact of the other, a power line, one of said armatures connected to the power line, a manually operable switch, and contacts associated with the switch in any position thereof, the other of said armatures connected to said switch contacts.

7. A regulator for motor-operated sugar centrifugals, which comprises a motor, an electro-magnetic brake, a manually-operated switch, a motor-operated switch, circuit connections between the above mentioned devices, means in the circuit to establish a direct connection to the brake, and a connection thereto through the motor-operated switch when the manually-operated switch is moved to start the motor, means for disconnecting the direct connection to the brake when the manually-operated switch is moved to a position to stop the motor, and means whereby the circuit through the motor-operated switch is maintained in either position of the manually-operated switch, said motor-operated switch being opened and closed only by the motor.

8. A regulator for sugar centrifugals, which comprises a manually-operated switch, a motor-operated switch, an electro-magnetic brake, means for establishing a direct circuit from the manually-operated switch to the brake, a control circuit from the manually-operated switch to the brake through the motor-operated switch when the manually-operated switch is moved to start the motor, and means for maintaining the circuit through the motor-operated switch independent of the position of the manually-operated switch, the condition of the motor-operated switch being dependent upon the motor alone.

FRANK HOWARD JONES.